United States Patent
Dietz et al.

(10) Patent No.: US 6,527,899 B1
(45) Date of Patent: Mar. 4, 2003

(54) PROCESS FOR PRODUCING A RUBBER-BASED DOUBLE-SIDED PRESSURE-SENSITIVE ADHESIVE TAPE

(75) Inventors: Bernd Dietz, Ammersbek (DE); Werner Kluge-Paletta, Buchholz (DE); Werner Karmann, Hamburg (DE); Bodo Szonn, Kisdorf (DE); Frank Henke, Neu Wulmstorf (DE)

(73) Assignee: tesa AG, Hamburg (DE)

( * ) Notice: Subject to any disclaimer, the term of this patent is extended or adjusted under 35 U.S.C. 154(b) by 261 days.

(21) Appl. No.: 09/063,745

(22) Filed: Apr. 21, 1998

(30) Foreign Application Priority Data

Apr. 23, 1997 (DE) .......................................... 197 16 996

(51) Int. Cl.$^7$ .......................... B29C 47/06; B29C 47/14; B29C 47/56; B29C 47/76; B29C 65/50
(52) U.S. Cl. .............................. 156/244.11; 156/244.24; 156/244.26
(58) Field of Search ........................... 156/289, 244.11, 156/244.24, 244.26

(56) References Cited

U.S. PATENT DOCUMENTS

| | | | |
|---|---|---|---|
| 3,073,371 A | * | 1/1963 | Leeper |
| 4,619,799 A | | 10/1986 | Teerling |
| 4,645,708 A | * | 2/1987 | LeGrand ................. 156/327 X |
| 4,952,447 A | * | 8/1990 | Phillips et al. ........... 428/318.6 |
| 5,047,196 A | | 9/1991 | Zuckenberg et al. |
| 5,589,122 A | | 12/1996 | Leonard et al. |
| 5,612,107 A | * | 3/1997 | Sangani et al. ............ 428/41.7 |
| 5,660,922 A | * | 8/1997 | Herridge et al. ..... 428/317.3 X |
| 5,688,859 A | * | 11/1997 | Schacht ................... 428/317.3 |

FOREIGN PATENT DOCUMENTS

| | | |
|---|---|---|
| DE | 3505128 A1 | 8/1986 |
| EP | 0305161 | 3/1989 |
| EP | 0453254 A2 | 10/1991 |

* cited by examiner

Primary Examiner—Jeff H. Aftergut
(74) Attorney, Agent, or Firm—Norris McLaughlin & Marcus

(57) ABSTRACT

Process for producing a pressure-sensitive double-sided adhesive tape, in which
  a) a ready-made rubber-based backing material is introduced into a screw extruder, where
    1. the backing material is heated by means of heating elements present on the screw extruder,
    2. in a degassing zone, the backing material is freed from volatile constituents by means of the application of reduced pressure,
    3. the backing material is homogenized and brought to the intended temperature,
  b) in a co-extrusion adapter, a barrier layer conveyed by means of a further appropriate melting and conveying unit is placed onto the backing material on both sides,
  c) the resulting intermediate laminate is supplied to a three-channel slot die and is uniformly extruded in web form,
  d) in the said three-channel slot die a pressure-sensitive hotmelt adhesive, supplied in each case with the aid of an appropriate melting and conveying unit, is applied, top and bottom, over the whole area of the intermediate laminate,
  e) the adhesive tape thus produced is placed onto an antiadhesive substrate, preferably siliconized paper,
  f) if desired, the adhesive tape is cooled and crosslinked.

26 Claims, 1 Drawing Sheet

Figure 1:
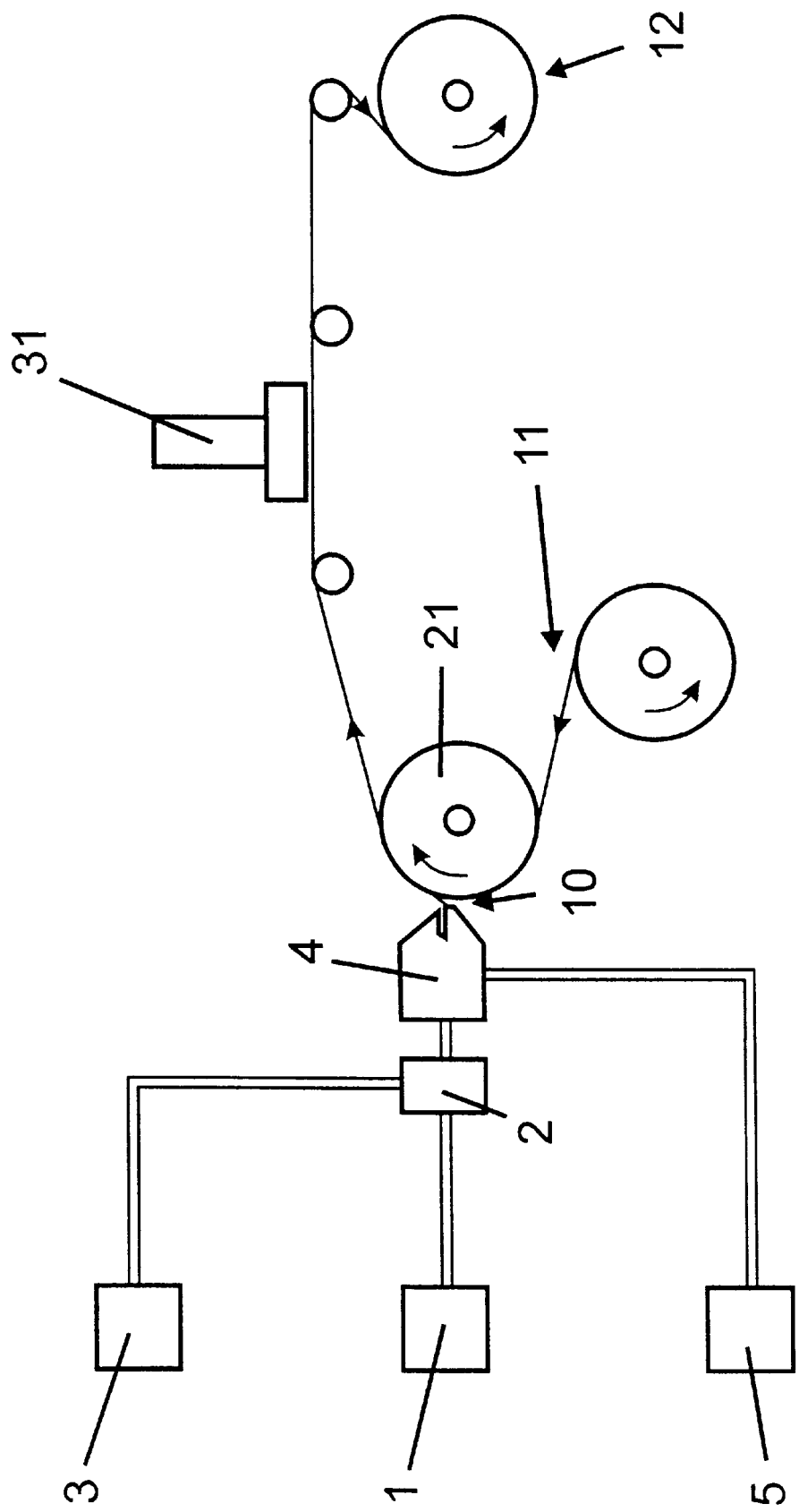

PROCESS FOR PRODUCING A RUBBER-BASED DOUBLE-SIDED PRESSURE-SENSITIVE ADHESIVE TAPE

The invention relates to a process for producing a rubber-based double-sided pressure-sensitive adhesive tape.

American Patent U.S. Pat. No. 4,440,829 describes a sticky-both-sides bonding tape, and its process of production, whose backing is a milled mixture essentially comprising crosslinked and uncrosslinked butyl rubber, pigments and plasticizers. These starting materials are processed in a mixer to form a composition. The composition is subsequently extruded to form a backing which is in tape form, is millable and extrudable, and which also has sufficiently high tensile strengths.

Extrusion takes place directly into an organic solution of the pressure-sensitive adhesive, preferably based on acrylic copolymers. The adhesives selected are those having not only a high bond strength and sufficient shear strength but also enough adhesion to the backing to cause the bonding tape to fail cohesively when peeled from a substrate.

Excess adhesive is washed off, and the resulting adhesive tape is placed on a release layer (liner) and subsequently, if desired, wound up into a roll.

The procedure described has the disadvantage that large amounts of plasticizer must be used in order to ensure the-possibility of processing by milling and extrusion. However, these large amounts of plasticizer reduce the desired high strength of the rubber backing. In addition, it is known from experience that plasticizers migrate to the surfaces of the backing and so hamper the anchoring of the adhesive. Moreover, they may also migrate directly into the adhesive, thereby reducing its bonding strengths and shear strength.

In addition, the application of the adhesive takes place from an organic solution after extrusion, which involves a high energy input to remove the organic solvent from the applied layers. Finally, complex drier designs are necessary in order to allow economic belt speeds.

Then, also, account must be taken of the explosion and fire prevention provisions in force.

Since there is no possibility of subsequent crosslinking, moreover, the tensile strengths which the product is able to achieve are predetermined by the maximum processing viscosities of the mills and of the extruder.

It was an object of the invention to provide a process which allows a double-sided pressure-sensitive adhesive tape with a rubber-based backing to be produced in the most efficient manner possible.

This object has been achieved by a process as set out in more detail below.

Accordingly, the process for producing a double-sided pressure-sensitive adhesive tape features the process steps set out below.

First of all, a ready-made, rubber-based backing material is placed in a screw-type extruder, preferably a single-screw extruder. This material can be fed in in the form of feed strips.

The manufacture of the feed strips is familiar to the skilled worker, beginning as it does with the mixing of the individual components of the backing material, preferably batchwise, in an internal mixer of the type typical for elastomer compounding (for example, a Banbury internal mixer); alternatively, in-line preparation by means of screw machines is possible. The backing material mixture can then be milled to the desired thickness on customary equipment, provided with an internal release agent, and cut into feed strips of a geometry appropriate for the extruder intake. Finally, these strips can be laid as wigwag rough sheet on pallets.

In the extruder, the backing material is picked up by the single or two or more rotating screw(s) and transported downstream. In addition to the shear energy deployed, heating elements disposed on the screw extruder barrel, above all, ensure that the backing material is heated.

In a commercially customary degassing zone, the backing material is freed from volatile components by means of the application of reduced pressure.

Downstream of the degassing station the backing material is transported further, homogenized and brought to an intended temperature of 120° C. to 160° C.

In the second step of the process, the backing material is supplied to a co-extrusion adapter customary in the plastics processing industry, in which a barrier layer is placed over both sides of the backing layer by means of an appropriate manifold insert. the barrier layer here is fed in by means of a further extruder or another suitable apparatus for the melting and conveying of thermoplastic media. This apparatus can comprise, for example, the drum melters, premelters, melt pumps or other melting and conveying units that are customary in the adhesives industry.

The term extruder is to be understood below as including other suitable above-mentioned melting and conveying units. It also refers to the combination of extruder and melt pump that can be employed in this case in order to improve the constancy of conveying. Suppliers of such melt pumps include, for example, the companies Maag (Zürich, Switzerland) and Witte (Itzehoe, Germany).

The resulting intermediate laminate is supplied to a three-channel slot die and is uniformly extruded in web form.

In the three-channel slot die, a pressure-sensitive hotmelt adhesive, supplied in each case with the aid of an appropriate melting and conveying unit, is applied in an appropriate coat thickness, top and bottom, over the whole area of the intermediate laminate.

The adhesive tape thus produced is placed onto an antiadhesive substrate, preferably siliconized paper.

If desired, the adhesive tape is cooled and crosslinked.

In this case crosslinking of the backing material takes place preferably with by means of electron beams in the dose range from 30 to 150 kGy, preferably from 50 to 100 kGy, with acceleration voltages of between 200 kV and 1000 kV, depending on the weight per unit area of the layer through which irradiation is to take place.

An alternative option is thermal crosslinking. If thermal crosslinking is provided in place of electron beam crosslinking, then the desired processes can be realized by means of suitable thermal activation sections, such as contact dryers, convection dryers, IR sources or microwave excitation.

By crosslinking it is possible to tailor the mechanical properties of the backing material to the properties required in the product.

The resulting adhesive tape can be wound up into bales of the desired length and processed further to the end product with the aid of widespread customary end-processing operations.

In an advantageous embodiment of the process, between process steps a) and b), an adhesion promoter is additionally applied to both sides of the backing material by means of an appropriate manifold.

Advantageously, the hotmelt pressure-sensitive adhesive is supplied to a single melting and conveying unit, such as an extruder, is melted, transported and applied uniformly to both sides of the intermediate laminate by means of appropriately placed pipelines; in other words, in particular, with symmetrically guided pipelines and die.

Also necessary for the process of the invention is adaptation to the processing viscosities and processing temperatures of the backing material and the hotmelt pressure-sensitive adhesive. As usual in co-extrusion, the processing viscosities should be matched as well as possible to one another within the relevant shear gradient range. The viscosity ratio of backing material to hotmelt pressure-sensitive adhesive should not exceed 10, advantageously 8. The processing temperatures of the materials employed should differ by not more than 50° C., preferably by less than 30° C., from one another.

The rubbers used as backing material are, in particular, a natural rubber, a butyl rubber, an acrylonitrile-butadiene rubber, a random styrene-butadiene rubber or a blend of these rubbers, preferably a blend of a natural rubber and a random styrene-butadiene rubber, and with very particular preference a natural rubber.

The rubber advantageously has a Mooney value $ML_{(1+4)}$ (100° C.) of from 40 to 80.

The rubbers used as backing material can have been blended with one or more additives, such as anti-ageing agents, crosslinkers, light stabilizers, ozone protectants, fatty acids, resins and vulcanizing agents, and can also have been filled with one or more fillers, such as carbon black, zinc oxide, silica, silicates and chalk, especially in order to tailor the mechanical properties of the backing material to the subsequent use of the adhesive tape.

Then, advantageously, the rubbers that are used for backing material are also blended with liquid polyisobutylene, copolymers thereof or liquid polyisoprenes as plasticizers, and specifically high-molecular-weight liquid grades of polyisobutylene or of polyisoprene. These grades make it possible to obtain, with only a small migration tendency, a defined lowering and adaptation of the viscosity of the backing material to the other components that may be employed in the subsequent course of the process.

In addition, liquid polyisobutylene, copolymers thereof or liquid isoprenes act as a processing aid. They promote the production of smooth surfaces and counter the strong, unwanted elastic effects that occur during processing, such as the stretch-widening of the backing material.

Alternatively, the rubbers used as backing material can be blended with an electron-beam-crosslinking plasticizer (so-called crosslinking promoter), examples of which are polyfunctional acrylates, such as polyfunctional polyglycol acrylates, acrylate esters or polyester acrylates. The invention, however, is not restricted to the acrylates recited here. Other acrylates which can be crosslinked by means of electron beams, rather, are also within the concept of the invention.

These acrylates and the other plasticizers are incorporated into the backing material or the barrier layer or into backing material and barrier layer, but preferably into the backing material. Given careful formulation, they improve the adhesion of selected adjacent layers. In addition, these substances act as a processing aid for extrusion and lessen the required dose in the case of electron beam crosslinking.

By using them it is possible to replace some or all of the other plasticizers.

In a particularly advantageous mixture, the backing material has the following composition:

| | |
|---|---|
| rubber content | from 40 to 70% by weight, |
| filler content | from 10 to 50% by weight, |
| plasticizer content | from 4 to 40% by weight, |
| anti-ageing agent | from 0.1 to 2% by weight, |
| vulcanizing auxiliary | less than 10% by weight, |
| optional foaming agent | less than 10% by weight, |
| optional colorant content | less than 5% by weight. |

If the abovementioned crosslinking promoters are employed, the content of the plasticizer in the form of the crosslinking promoters falls to 1–10% by weight.

If the backing material is to be foamed, a suitable foaming agent must be added to it. In this case the process must be extended by one additional process step, namely thermal activation.

The colorant serves merely to establish a particular colour in the backing material.

It is also preferred for the backing material to have a thickness of from 300 μm to 2000 μm, in particular from 400 μm to 1200 μm, the thickness of the backing material depending of course on the later intended use of the adhesive tape.

In the case of a process operating with electron beam crosslinking the thickness of the backing layer is selected such that the overall material thickness does not exceed 1000 g/m². This ensures that inexpensive, single-stage electron sources can be employed without excessive screening expense, which should in any case be the case simply for reasons of radiation protection. Single-stage electron sources possess at optimum an acceleration voltage of around 300 kV, and necessitate a subsequent operation owing to the requirement of double-sided crosslinking.

Double-sided crosslinking by means of a second single-stage electron beam crosslinking unit is also possible, in which case a single operation is maintained.

When using multistage electron beam crosslinking units with acceleration voltages in the range of several MeV it is also possible to achieve homogeneous crosslinking of weights per unit area markedly above 1000 g/m² in one operation.

By means of suitable physical or chemical foaming agents it is possible to realize, by means of a marked reduction in density, foamed backing materials with layer thicknesses of several millimetres, especially two millimetres. This also makes it possible to cover relatively large surface roughnesses and joint tolerances, so that by means of this process it is possible to produce a large proportion of the layer thicknesses required by the market.

Thermally crosslinkable systems may, furthermore, achieve backing-material thicknesses of markedly greater than two millimetres.

The lower limit to backing thickness is set by falling conformability, especially in the case of rough substrates.

Express reference is made to the known methods of all-purpose rubber formulation and processing and to the additives employed for this purpose; for instance, the book by Werner Kleemann ("Mischungen für die Elastverarbeitung" [Mixtures for elastomer processing]).

The barrier layer applied to the backing material consists advantageously of PVDC, EVOH or nitrile rubber, preferably of partially crystalline polyamide grades, although other materials which can be processed from the melt and have barrier properties can be used.

The above-mentioned materials can be employed as dried, flowable granules without further operations for the process of the invention. Their selection depends on the barrier properties that can be obtained, on the anchoring effect with respect to the layer of backing material and the adhesive layer, and on the processing properties.

The purpose of the barrier layer is essentially to prevent migrating substances from the backing material from migrating into hotmelt pressure-sensitive adhesive and so reducing the anchorage of hotmelt pressure-sensitive adhesive to backing material. It is also intended to rule out any impairment of the bonding strengths and/or of the shear strength of the pressure-sensitive adhesive layer. Furthermore, the barrier layer is intended to prevent, or at least effectively reduce, any adverse effect on the backing material by the adhesive layer or by atmospheric constituents (for example, oxygen or ozone). This barrier layer is applied in an amount which on the one hand gives a complete and coherent film on the subsequent adhesive tape but on the other hand has no notable effect on the carefully balanced mechanical properties, such as elongation at break and tensile strength, of the carrier material. In addition, the amount must be sufficient to effectively counter migration under the conditions in which the eventual adhesive tape is employed; in other words, for example, under elevated temperature or shear stress.

The barrier layer can additionally be blended with adhesion promoters, especially when particularly strong anchorage between the layer of the backing material and the barrier layer is required.

The adhesiveness of the barrier layer can be improved by an appropriate blend with the known adhesion promoters. Examples that may be mentioned here include ionomers, special LDPE grades, EVA, anhydride-modified polyolefins, and EAA.

Alternatively, known adhesion promoters can be applied to the rubber backing as a separate layer. Here again, the amount of adhesion promoter to be chosen is that which ensures sufficient adhesion between the layer of the backing material and the barrier layer under the conditions under which the product is employed but without notable effect on the carefully balanced mechanical properties, such as elongation at break and tensile strength, of the backing.

The barrier layer has a thickness of from 5 to 40 $\mu$m, in particular from 10 to 30 $\mu$m.

The viscosity ratio of backing material to barrier layer preferably does not exceed 5 and especially does not exceed 2.

The hotmelt pressure-sensitive adhesive, preferably an acrylate system and/or a synthetic rubber system, is applied with a weight per unit area of from 30 to 100 $g/m_2$, preferably from 40 to 80 $g/m_2$.

The adhesive compositions employed are, with very particular preference, suitable hotmelt pressure-sensitive adhesives based on acrylate, and indeed an acrylate system which can be electron-beam-crosslinked in the dose range from 30 to 150 kGy.

The acrylate-based hotmelt pressure-sensitive adhesives can be polymerized from the monomers by the customary techniques and concentrated. They are dispensed, for example, into drums or antiadhesively treated containers in which the hotmelt pressure-sensitive adhesives are held at temperature until coating takes place, or are melted for the purpose of coating.

In the process of the invention the hotmelt pressure-sensitive adhesive is preferably dispensed in strand form and fed as a feed strand to a melt extruder. It is also possible, however, for the alternative melting and conveying units described to be employed.

In the process proposed, the barrier layer granules are fed to a melting and conveying extruder by way of a hopper. The throughputs, and hence the layer thicknesses of the individual materials, are controlled by way of the rotary speed of the respective extruders; if operating with melt pumps, by way of the rotary speed of these pumps.

The present invention describes a process for producing a high-performance double-sided adhesive tape with high shear strength and particular low-temperature strength. A further important property of the high-performance adhesive tape is the high adhesive force, in order to obtain good bond strengths. The adhesive tape is a symmetrical multilayer system consisting of one layer of a backing material in the middle, one barrier layer on each side of the backing material, and one adhesive layer on each barrier layer.

The process of the invention makes it possible, economically and in one operation, to produce the said high-performance adhesive tape, having the special properties mentioned, with essentially inexpensive raw materials.

Plant components required for implementing the process steps are at least one powerful principal extruder, alone or in combination with an appropriate discharge pump, a secondary extruder for the barrier layer, a further secondary extruder for the adhesion promoter, if desired, and at least one extruder for the adhesive layer. Alternatively, it is possible for conveying purposes to employ other appropriate, abovementioned melting and conveying units in each case. Further requirements are a co-extrusion adapter, a multichannel slot die, a take-off device and a cooling device, a crosslinking unit, preferably an electron beam crosslinker, and a winding device.

In the text below the process of the invention and the plant components required for it will be described in more detail, with reference to a figure, without thereby wishing to restrict the invention unnecessarily.

The addition of the ready-made backing material takes place in the form of feed strips into the intake of the principal extruder (1), which is a single-screw extruder. The rotating screw in the principal extruder (1) picks up the backing material and transports it downstream. By virtue of the shear energy applied by means of the screw in the principal extruder (1), and of the heating elements disposed on the principal extruder (1), the backing material is heated, and is freed from volatile fractions in a degassing zone, by means of the application of reduced pressure. After passing through the degassing station, the backing material is transported further, homogenized and brought to a uniform temperature of around 150° C.

Extraneous substances and coarse particles from the mixing preparation process are removed by sieve assemblies of a conventional melt filter.

The backing material, which is now at its intended temperature, is, in the subsequent course of the process, supplied to a co-extrusion adapter (2) which is customary in the plastics processing industry. In the co-extrusion adapter (2) the barrier layer, which is in liquid melt form and is supplied from a secondary extruder (3), is applied to the backing material by means of an appropriate manifold insert, giving rise to a two-component intermediate laminate.

If required, although not shown here, directly beforehand and also in the adapter, an adhesion promoter is applied between backing material and barrier layer by means of an appropriate manifold insert.

The geometry of the manifold inserts referred to should be adapted to the prevailing process parameters so as to give smooth, uniform, coherent layer thicknesses over the entire web width.

The intermediate laminate is transported further downstream into the middle melt channel of a three-channel slot die (4), also referred to below as multichannel die, where it is extruded in web form by means of an appropriate channel geometry. Adjustment of the layer of the intermediate laminate is carried out by means of an appropriate device for melt calibration, such as a restrictor bar. The use of an appropriately configured membrane is also possible.

The hotmelt pressure-sensitive adhesive, likewise melted and transported with the aid of a further secondary extruder (5), is fed into the upper and lower melt channels of the multichannel die (4); it is extruded in the same way as for the intermediate laminate, and the layer thickness distribution is adjusted separately. In the combining section of the multichannel die (4) the two layers of the hotmelt pressure-sensitive adhesive are brought together with the intermediate laminate and are laid on top of one another under coating pressure.

An adjustment of the layer thickness distribution of the overall laminate takes place in the exit region of the multichannel die by means of flexible lips.

The adhesive tape (10) thus obtained is placed onto an antiadhesive substrate, a siliconized paper (11). The adhesive tape (10) is guided here by a cooling roller (21) which ensures adequate cooling of the adhesive tape (10).

It is possible, but is likewise not shown here, to carry out further cooling using appropriate cooling devices.

A device (31) is used to subject the adhesive tape (10) to electron beam crosslinking. The radiation dose here is in the range from 30 to 150 kGy, and in this case specifically is 80 kGy. The acceleration voltage must be selected in accordance with the weight per unit area of the product; for single-stage accelerator units, common voltages are from 200 to 300 kV. It is also possible to employ multistage accelerator types with voltages up to several thousand kV.

Finally, the adhesive tape (10) in the desired length is wound up into bales (12) and can be processed further to give the end product by means of known end processing techniques.

Furthermore, an adhesive tape produced in accordance with the process of the invention will be described with the aid of an example.

EXAMPLE

In order to produce a high-performance adhesive tape by means of co-extrusion, a single-screw extruder having a diameter of 90 mm (principal extruder) was fitted with a co-extrusion adapter and a three-layer die.

As the secondary extruder for supplying the co-extrusion adapter with barrier layer material, a single-screw extruder having a diameter of 45 mm was employed.

The secondary extruder for conveying the hotmelt pressure-sensitive adhesive to the multichannel die had a diameter of 60 mm.

To remove volatile fractions, the principal extruder was equipped with a degassing station and was set at a temperature profile from 70° C. to 145° C. The throughput was 52 kg/h at a rotary speed of 20 1/min. The mixing temperature established was in the region of 150° C.

The secondary extruder for conveying the barrier layer was operated in the temperature range from 70 to 165° C., and resulted in a melt temperature of 166° C. The throughput was fixed at 4 kg/h.

The secondary extruder for conveying the hotmelt pressure-sensitive adhesive was operated in the temperature range from 80 to 135° C., and resulted in a melt temperature of 140° C. The throughput was fixed at 6 to 9 kg/h.

With a die operating width of 400 mm the take-off rate was 4.5 m/min. The adhesive web obtained in this way was subjected to electron beam crosslinking on both sides with 80 kGy and an acceleration voltage of 350 kV.

The adhesive tape obtained featured uniform, coherent films of the barrier layers on the backing material and of the hotmelt pressure-sensitive adhesive layers on the barrier layers.

The layer thickness of the backing material was found to be 500 µm, the thickness of each of the barrier layers 20 µm, and the thickness of the hotmelt pressure-sensitive adhesive coating 45 µm in each case.

What is claimed is:

1. Process for producing a pressure-sensitive double-sided adhesive tape, comprising the steps of, in order:
   a) introducing into a screw extruder a ready-made rubber-based backing material, and processing at temperatures below the melting point of the backing material, wherein
      1. the backing material is heated by means of heating elements present on the screw extruder,
      2. in a degassing zone, the backing material is freed from volatile constituents by means of an application of reduced pressure,
      3. the backing material is homogenized and brought to an intended temperature,
   b) in a co-extrusion adapter, a barrier layer conveyed by means of a melting and conveying unit is placed onto the backing material on both sides of the backing material, the barrier layer being chosen as a material which has the ability to prevent substances migrating from the backing material into an adhesive layer,
   c) a resulting intermediate laminate is supplied to a three-channel slot die and is uniformly extruded in web form,
   d) in the said three-channel slot die a pressure-sensitive hotmelt adhesive, supplied in each case with the aid of an appropriate melting and conveying unit, is applied, top and bottom, over a whole area of the intermediate laminate,
   e) an adhesive tape thus produced is placed onto an antiadhesive substrate,
   f) optionally, the adhesive tape is cooled and crosslinked, and
wherein a viscosity ratio of backing material to the barrier layer does not exceed 5 and a viscosity ratio of backing matenal to hotmelt pressure-sensitive adhesive does not exceed 10.

2. Process according to claim 1, wherein the backing material is crosslinked by means of electron beams in the dose range from 30 to 150 kGy, with acceleration voltages of between 200 kV and 1,000 kV.

3. Process of claim 2, wherein said does range is 50 to 100 kGy.

4. Process according to claim 1, characterized in that, between process steps a) and b), an adhesion promoter is additionally applied to both sides of the backing material.

5. Process according to claim 1, characterized in that the hotmelt pressure-sensitive adhesive is melted and transported in a melting and conveying unit and is applied to both sides of the intermediate composite by means of appropriately placed pipelines.

6. Process according to claim 1, wherein the rubbers used as backing material are a natural rubber, a butyl rubber, an acrylonitrile-butadiene rubber, a random styrene-butadiene rubber or a blend of these rubbers.

7. Process according to claim 6, characterized in that the rubber has a Mooney value $ML_{(1+4)}$ (100° C.) of from 40 to 80.

8. Process according to claim 6, wherein the rubbers used as backing material have been blended with one or more additives selected from the group consisting of anti-ageing agents, crosslinkers, light stabilizers, ozone protectants, fatty acids, resins and vulcanizing agents.

9. Process according to claim 6, wherein the rubbers used as backing material have been filled with one or more fillers selected from the group consisting of carbon black, zinc oxide, silica, silicates and chalk.

10. Process according to claim 6, characterized in that the rubbers used as backing material have been blended with polyisobutylene, copolymers thereof or polyisoprenes as plasticizers.

11. Process according to claim 6, wherein the rubbers used as backing material have been blended with an electron-beam-crosslinking plasticizer.

12. Process of claim 11, wherein said plasticizer is a multifunctional acrylate.

13. Process according to claim 6, characterized in that the backing material has the following composition:

| | |
|---|---|
| rubber content | from 40 to 70% by weight, |
| filler content | from 10 to 50% by weight, |
| plasticizer content | from 4 to 40% by weight, |
| anti-ageing agent | from 0.1 to 2% by weight, |
| vulcanizing auxiliary | less than 10% by weight, |
| optional foaming agent | less than 10% by weight, |
| optional colorant content | less than 5% by weight. |

14. Process of claim 6, wherein said rubbers are a blend of natural rubber and a random styrene-butadiene rubber.

15. Process of claim 6, wherein said rubbers are natural rubber.

16. Process according to claim 1, wherein the backing material has a thickness of from 300 to 2000 µm.

17. Process of claim 16, wherein said thickness is 400 to 1200 µm.

18. Process according to claim 1, wherein the barrier layer is comprised of PVDC, EVOH or nitrile rubber.

19. Process according to claim 1, characterized in that the barrier layer has additionally been blended with adhesion promoters.

20. Process according to claim 1, wherein the barrier layer has a thickness of from 5 to 40 µm.

21. Process of claim 20, wherein said thickness of said barrier layer is from 10 to 30 µm.

22. Process according to claim 1, wherein the electron-beam-crosslinking plasticizers are added in the backing material or in the barrier layer or in both the backing material and the barrier layer.

23. Process according to claim 1, wherein the hotmelt pressure-sensitive adhesive is applied with a weight per unit area of from 30 to 100 g/m$^2$.

24. Process of claim 23, wherein said hotmelt pressure-sensitive adhesive is an acrylate system, a synthetic rubber system or a combination thereof, and is applied in an amount of 40 to 80 g/m$^2$.

25. Process of claim 1, wherein said barrier layer is comprised of polyamide.

26. The process of claim 1, wherein the temperature of step (a) does not exceed about 150° C.

* * * * *